June 7, 1966

C. B. CAPERTON 3,254,851

DRIVE FOR RODDING MACHINE

Filed Dec. 27, 1963

FIG_3_

FIG_4_

FIG_5_

FIG_6_

INVENTOR.
Charles B. Caperton,
BY
Paul & Paul
ATTORNEYS.

June 7, 1966  C. B. CAPERTON  3,254,851
DRIVE FOR RODDING MACHINE
Filed Dec. 27, 1963  7 Sheets-Sheet 7

FIG_21_

INVENTOR.
Charles B. Caperton,
BY
Paul & Paul
ATTORNEYS.

United States Patent Office 3,254,851
Patented June 7, 1966

3,254,851
DRIVE FOR RODDING MACHINE
Charles B. Caperton, 1832 Pine St., Philadelphia, Pa.
Filed Dec. 27, 1963, Ser. No. 338,549
19 Claims. (Cl. 242—54)

This application is a continuation-in-part of my earlier-filed copending application Serial No. 301,841, filed Aug. 13, 1963, now abandoned, entitled "Drive for Rodding Machine."

This invention relate to rodding equipment of a type used in the cleaning and maintenance of sewer pipes, water pipes, and other underground conduits and structures.

Sewer pipes, water pipes and the like are customarily cleared of obstructions (such as tree roots, sand, dirt, etc.) by feeding into the pipe steel rod having at the foremost extremity a suitable tool for performing the particular cutting or clearing operation. Such tool, for example, may be an auger bit, a root saw, a centrifugal cutter, a pick-up, or any other of a large variety of tools especially adapted for the purpose.

The point of the obstruction in the pipe may, of course, be far removed from the point of entry into the pipe, and accordingly the tool may be at the foremost end of a rod whose length may be of the order of 900–1000 ft. In some cases, such long length of rod is a continuous piece but in other cases the rod is comprised of a string of individual solid rods of ¼"–⅜" spring steel stock, each rod being about 39 inches long, the rods being coupled together by suitable couplings to form a continuous length.

For storing such long lengths of coupled steel rods when not in use, or for transporting such rods to another work location, reels have been developed capable of holding 900–1000 feet of coupled rods. Such reels are designed to confine the rods in coils or loops of large diameter in order to avoid bending the individual rod into a permanent set. A typical rod reel may have a diameter of 4 to 8 feet.

In order for the tool, particularly a cutting tool, to be effective, it is necessary ordinarily for the coupled rods to be rotated axially, and a power drive for this purpose is necessary.

It is, of course, also necessary to push the tool into the pipe, and to withdraw the tool from the pipe, and for these purposes a power drive is necessary to move the coupled rods in the lengthwise directions.

The present application is particularly directed to the provision of an improved means for driving coupled rods in their axial or lengthwise directions for pushing the tool into the pipe or for withdrawing the tool from the pipe.

Rodding machines may be of either one of two general types, so far as the storage reel is concerned. In one type, the plane of the coiled rods when stored in the reel is perpendicular to the line along which the rods are taken from and fed back into the rodding machine. In the other type, the rods are fed to and taken from the reel along a line which is substantially in the same plane as the coiled rod stored in the reel. My improved drive means are suitable for either type.

My invention will become clear from the following detailed description taken together with the drawings wherein.

In the description which follows it will be convenient to consider the long length of coupled rods as a single unit and to refer to it as coupled rod.

Figure 1:
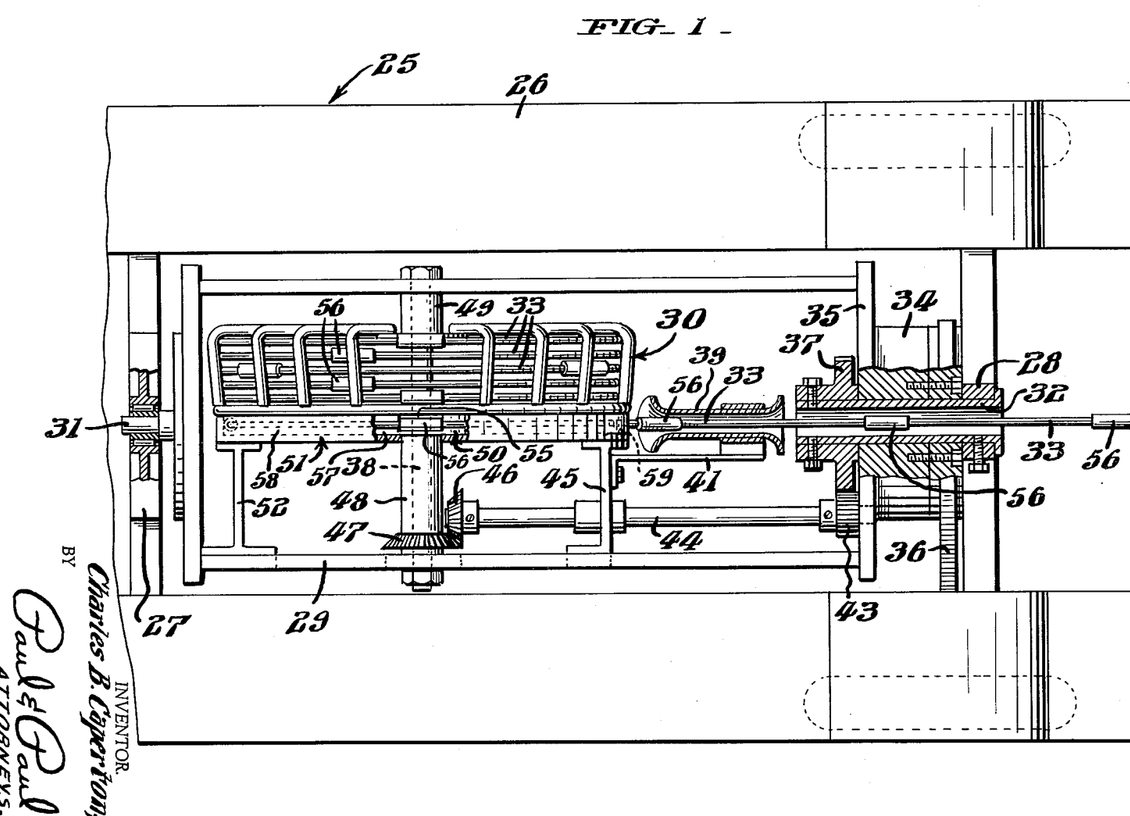
FIG. 1 is a top plan view, partly broken away, of a rod reel embodying my improved drive in one form.
Figure 2:
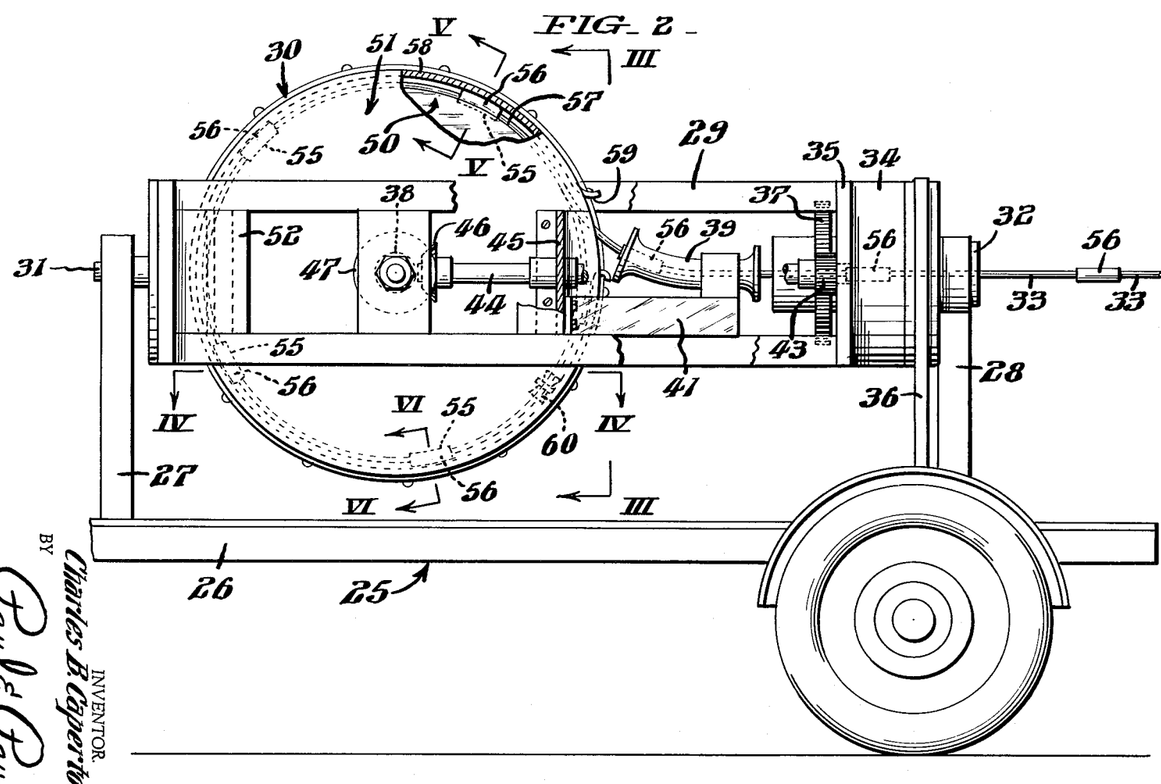
FIG. 2 is a side elevation, partly broken away, of the rod reel of FIG. 1.
Figure 3:
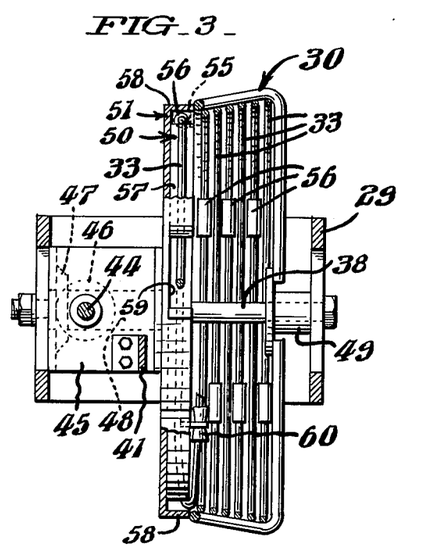
FIG. 3 is a front elevation, partly broken away, as viewed along the line III—III of FIG. 2.
Figure 4:
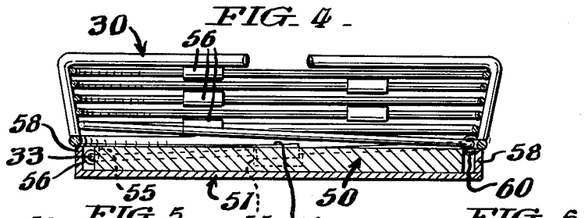
FIG. 4 is a top plan view, in section, looking downward along the line IV—IV of FIG. 2.
Figure 5:
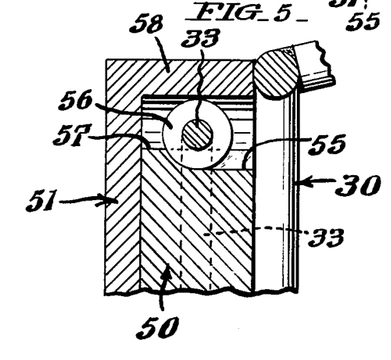
FIG. 5 is a detail view, in section, along the line V—V of FIG. 2.
Figure 6:
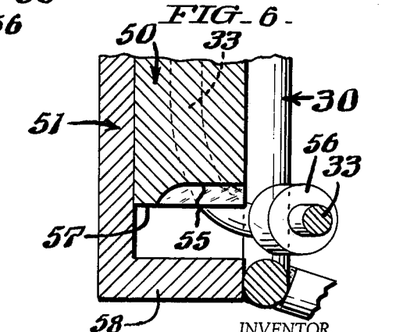
FIG. 6 is a detail view, in section, along the line VI—VI of FIG. 2.

Referring now to FIGS. 1 and 2, there is illustrated a mobile unit 25 having a base member 26 and at each end thereof a vertical support member 27 and 28 for supporting for rotation therebetween a frame 29 which carries the rod reel 30 and the rod drive mechanism to be described.

Frame 29 is supported at one end by the trunnion 31 and at the other end by a fixed elongated hollow cylindrical member or tube 32 through which passes the rod 33.

Rotatably supported on the tube 32 is a drum 34 the inward side of which is secured to the end member 35 of rotatable frame 29. Drum 34 is provided with a V-notch forming a sheave for receiving the V-belt 36 for driving the drum 34 and the frame 29.

Secured to the inward end portion of the fixed support tube 32 is a gear 37. It is to be understood that gear 37 does not rotate with the frame 29. In mesh with the fixed gear 37 is a pinion 43 which is fixed to a longitudinal shaft 44. A central portion of shaft 44 is journaled in a support bracket 45 which is secured to the frame 29 and is rotatable therewith. That end of shaft 44 having thereon the pinion 43 is secured to end member 35 of frame 29. The other end of shaft 44 has secured thereto a bevel gear 46. Bevel gear 46 meshes with a second bevel gear 47 which is fixed to a sleeve 48 supported by a fixed cross shaft 38 secured to the frame 29.

Secured to the inward end of sleeve 48 is a wheel 50 having thereabout a peripheral guard 51 which is supported by the brackets 45 and 52 fixed to the frame 29.

Thus, when the bevel gears 46, 47 are driven the wheel 50 is driven rotationally by the sleeve 48, but the peripheral guard 51 is fixed and does not rotate.

Supported by the other end of the fixed cross shaft 38, for rotation thereabout, is a sleeve 49 to which is secured the cage or reel 30. Reel 30 and the sleeve 49 are adapted to rotate freely about the fixed shaft 38.

While the reel 30 is physically located adjacent to the wheel 50, there is no fixed connection between the reel 30 and the wheel 50, the only connection being the coupled rod 33. As will be described more fully later, when the wheel 50 is driven rotationally to pull the coupled rod 33 from the reel 30 (or to return the coupled rod to the reel), the reel is free to rotate in response to the forces applied thereto.

The structure of one form of wheel 50 and guard 51 is illustrated in FIGS. 3–10. The wheel 50 is illustrated as a disc having a peripheral rim 57 which is provided with a plurality of recesses or slots 55 at equally spaced intervals. Five slots are shown in the illustration at 72° spacing, but this is merely illustrative. The slots 55 are shown to be open at one side, the side facing the reel 30. The slots 55 receive the couplers 56 of the coupled rod 33 and, accordingly, the slots 55 are so spaced that the arcuate distance between the slots is equal to the spacing between the couplers 56 of the rod 33. Secured to the hub of the wheel 50 is the sleeve 48 to which is fixed the bevel gear 47.

Figures 7, 8, 9, 10:
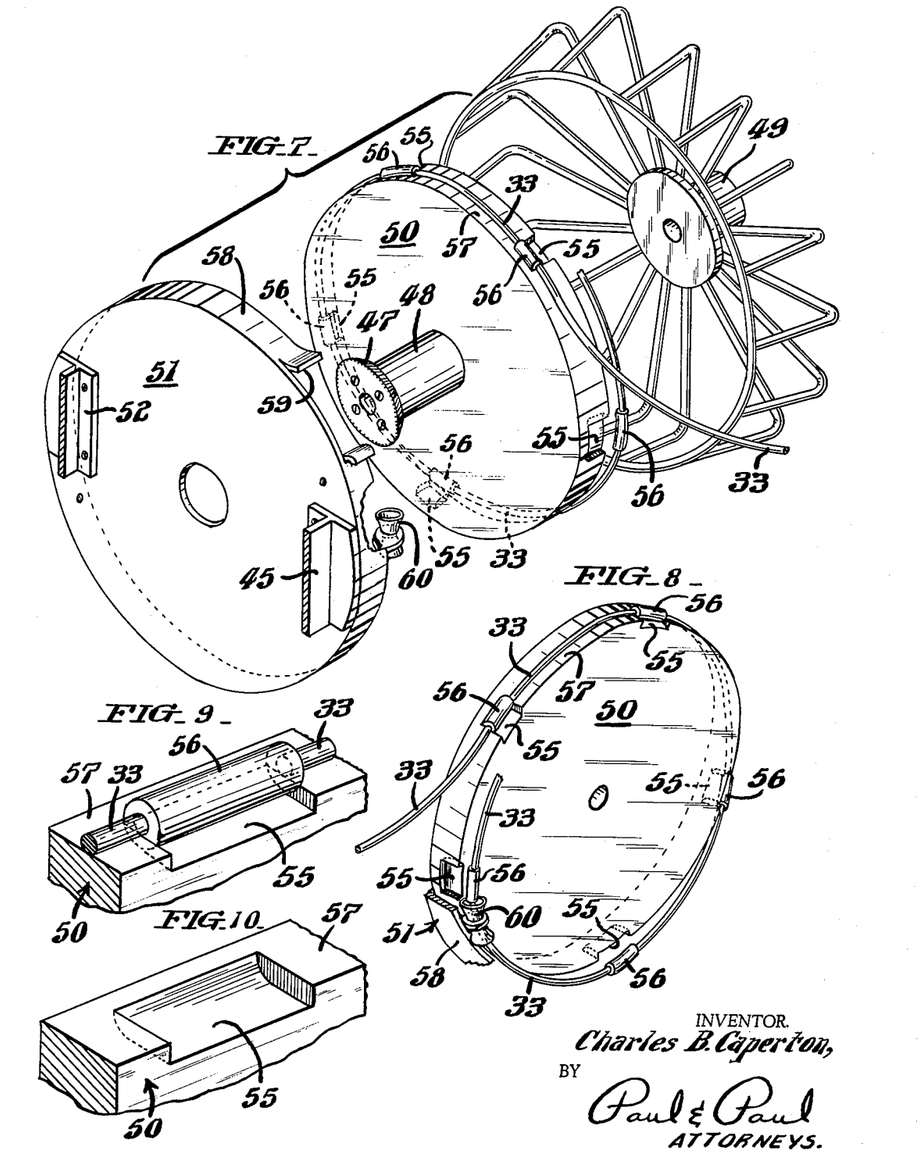
FIG. 7 is an exploded perspective view of the wheel guard, drive wheel and cage showing my improved drive in one form, although not the preferred form.
FIG. 8 is a perspective view of the drive wheel of FIG. 7 as viewed from the cage side.
FIGS. 9 and 10 are detail views of the slots for the couplers.

As previously mentioned above, wheel 50 is provided with a peripheral guard 51 which is fixed, by the brackets 45 and 52, to the rotatable frame 29. Guard 51 is illustrated as a cover disc having a peripheral flange 58 which extends inwardly toward the reel 30 covering the slotted rim 57 of the wheel 50. The flange 58 does not cover the entire 360° of the rim 57 of wheel 50; a gap 59 is provided in the flange to allow for passage of the coupled rod 33 enroute to or from the pipe to be cleared.

The wheel 50 and also the guard 51 are illustrated in FIGS. 1–8 as being discs, but this is not necessarily a preferred form. To conserve material and to reduce weight the wheel 50 may preferably be a spoked wheel, and similarly the guard 51 may preferably be comprised of radial spokes having a circumferential inwardly-extending flange.

It will be understood that guard 51 is made sufficiently larger in diameter than wheel 50 to allow the inwardly extending rim 58 to cover not only the slotted perimeter of the wheel but also the encircling portion of rod 33 and couplers 56 in the slots 55.

As seen best in FIGS. 7 and 8, a flared guide tube or eye 60 is fixed to the rim 58 of the guard 51 on the inward side thereof for guiding the coupled rod 33 from the cage of the reel 30 on to the rim 57 of the wheel 50. Also, as seen best in FIGS. 1 and 2, a flared guide tube 39 is fixed, as by a bracket 41, to the frame 29 for guiding the coupled rod 33 from the slotted rim 57 of wheel 50 to the tube 32 through which the rod passes enroute to the pipe to be cleared.

Figures 11, 12, 13, 19:
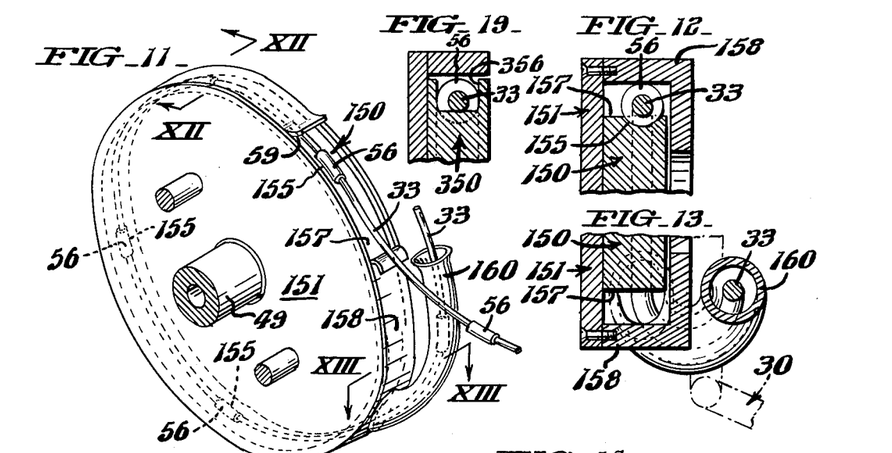
FIG. 11 is a perspective view of a preferred form of drive wheel showing the wheel guard in place.
FIGS. 12 and 13 are detail views, in section, along the lines XII—XII and XIII—XIII respectively of FIG. 11.
FIG. 19 is a detail view representing a modification of FIG. 12.

The form of wheel presently preferred is different in one respect from that just described, the preferred form being illustrated in FIG. 11, and identified by the reference numeral 150. As there shown, the slots 155 of the wheel 150 are not open on the one side, as is the case with the slots 55 of the wheel 50. Rather, the slots 155 are closed at both sides, and the coupled rod 33 is directed from the reel 30 onto the wheel 150 through a flared guide tube 160. The outward end of the guide tube 160 is located out of the plane of the wheel 150 on the reel side thereof, but the inward end of tube 160 is in the plane of the wheel 150, being joined tangentially to the peripheral flange 158 of the guard 151 at the middle region of the flange. Thus, the guide tube 160 guides the couplers 56 of the coupled rod 33 directly into the slots 155; and, since the rod 33 does not enter the slots of the wheel from the side, the peripheral flange 158 of the guard 151 may, if desired, be an angle piece with a depending portion on the reel side, as seen in cross section in FIG. 12, which is a view, in section, along the line XII—XII of FIG. 11. (Guard 51 of FIG. 7 may also, if desired, be provided with an inner depending flange for a portion of its periphery in the region where it would not conflict with the rod entering the rim 57 from the reel, or leaving the rim to enter the reel).

Figures 14, 15, 16, 17, 18:
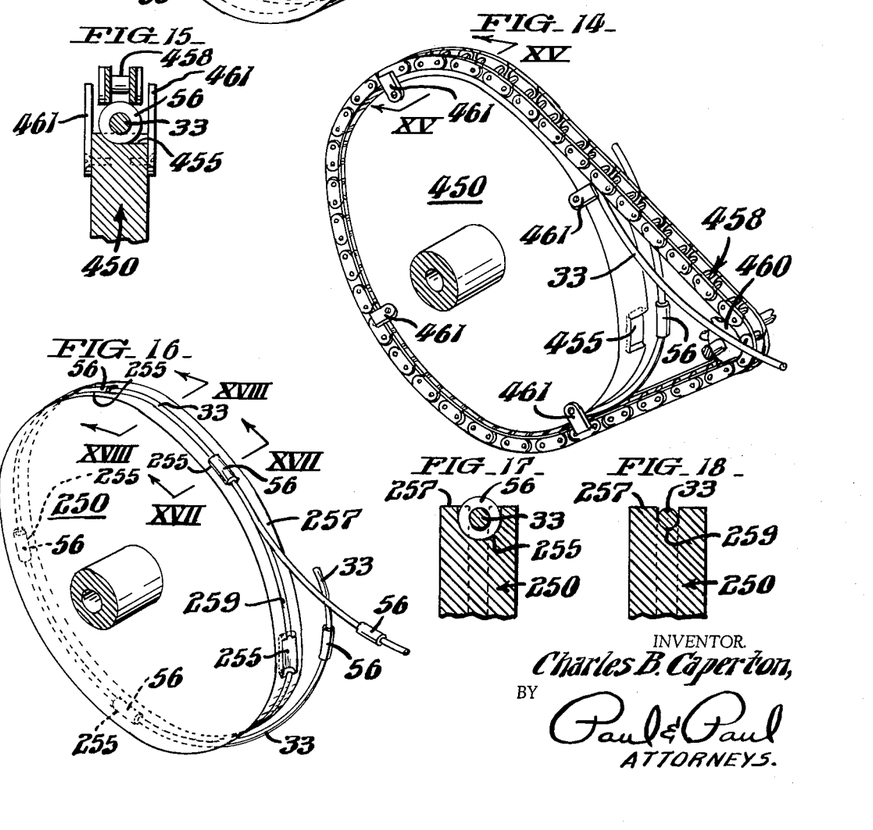
FIG. 14 is a perspective view of a drive wheel showing an alternate form of guard.
FIG. 15 is a detail view, in section, along the line XV—XV of FIG. 14.
FIG. 16 is a view of the preferred form of drive wheel of FIG. 11 but with the guard removed.
FIGS. 17 and 18 are detail views, in section, along the lines XVII—XVII and XVIII—XVIII respectively of FIG. 16.

FIG. 16 illustrates a wheel 250 having slots 255 which are deeper and the rim 257 is provided with a peripheral groove 259 connecting the slots 255 for receiving the rod of the coupled rod 33. The slots 255 are shown as closed at both sides, but the slots 255 need not be closed at either side since the groove 259 provides retention against lateral shifting of the coupled rod.

FIG. 19 is a sectional view depicting a further modification in which the rim of the wheel 350 is provided with upstanding peripheral flanges forming a peripheral channel 356 having a depth and width sufficient to receive fully the couplers 56 as well as the rod 33. Slots are, of course, provided in the floor of channel 356 for the couplers 56.

FIG. 14 represents a modification in which the wheel 450 is provided with slots 455 open at one side similar to those of the wheel of FIGS. 7 and 8, but in lieu of the fixed immobile guard 51 of FIG. 7, the wheel 450 of FIG. 14 is provided with an endless chain 458 which encircles a major portion of the periphery of the wheel 450, being supported thereon by the couplers 56, as seen in cross section in FIG. 15. An idler sprocket 460 is provided for supporting the chain 458 away from the periphery of the wheel 450 at the point where the coupled rod 33 leaves the wheel enroute to the pipe to be cleared. The wheel 450 is provided with spaced-apart upstanding retaining lugs 461 for retaining the chain in the plane of the wheel. If desired, it is obvious that the lugs 461 may be replaced by continuous upstanding retaining flanges.

Referring now to the operation of the embodiment illustrated in FIGS. 1–10, the coupled rod 33 coiled in the cage of reel 30 is threaded through the eye 60, then down and around the periphery of the wheel 50 in a clockwise direction as viewed in FIG. 7, then out through the gap 59 in the guard 51, through the guide tube 39, and finally through the tube 32. To drive the rod 33 outward from the rodding machine toward the pipe to be cleared, the reversible power drive (not shown) to which the drive belt 36 is attached is driven in a direction to rotate the drum 34 in a counter-clockwise direction, as viewed from the front of the rodding machine. The pinion gear 43 then rotates in a counter-clockwise direction on its own axis as it revolves about the fixed gear 37. Shaft 44 and bevel gear 46 rotate and drive bevel gear 47 in a clockwise direction as viewed in FIGS. 1 and 2. Sleeve 48 and wheel 50 are driven clockwise and, since one or more couplers 56 are engaged in the slots 55, the rod 33 is driven forward through the guide tube 39 and through the support tube 32. In being pulled from its coiled position in the cage of reel 30, the coupled rod 33 follows a path indicated in FIGS. 7 and 8 in which the rod passes through the flared eye 60 and enters gradually and diagonally on to the rim 57 of the wheel 50. At least two of the couplers 56 will ordinarily be firmly imbedded in slots 55, as illustrated in FIG. 9, before the rod 33 leaves the perimeter of the drive wheel 50 at the location of the gap 59 in the flange 58 of the guard 51.

As indicated previously hereinabove, the preferred form of wheel and guard is shown in FIG. 11. In FIG. 11, the rim 158 of the guard 151 is provided with a flared tube 160 which guides the coupled rod 33 from the cage of the reel all the way to the center portion of the rim 157 of the wheel 150. In this form, each of the couplers 56, between the point of entry of the rod on to the rim 157 and the point of exit from the rim, are fully engaged in the closed slots 155.

Attention is now called to the fact that when the drive wheel 50 is driven in a direction to pull the coupled rod 33 from its coiled position in the storage cage of the reel 30, and to drive the tool at the end of the rod forward into the sewer or other pipe obstruction, if forward movement of the rod is slowed or stopped by the pipe obstruction, the rod will tend to assume a loop about the drive wheel of larger diameter than the rim of the wheel and will thus tend to leave the rim. This is prevented by the guard flange 58 of FIG. 7 (or 158 of FIG. 11) which retains the rod 33 on the rim of the drive wheel.

As has already been pointed out, the forms of guard illustrated in FIGS. 7 and 11 are immobile relative to the wheel. In those situations, such as indicated above, where the rod tends to assume a loop of larger diameter than the drive wheel, the couplers 56 in the slots 55 (or 155) will slidingly and frictionally engage the undersurface of the guard flange. While the frictional resistance offered by an immobile guard flange is not excessive and is quite tolerable, this resistance may, if desired, be reduced by employing a mobile form of guard, such as is illustrated in FIG. 14, wherein the guard is in the form of an endless chain or belt 458 which is free to move with the coupled rod 33 while nevertheless containing the rod on the rim of the wheel.

While the mobile endless-chain or belt form of guard has been illustrated in FIG. 14 as guarding a wheel of the type shown in FIG. 7, it will be apparent that the mobile form of guard may also be employed to guard the wheel of the type shown in FIG. 11.

In the form of rodding machine illustrated in FIGS. 1 and 2, when the drive wheel 50 is driven rotationally to drive the rod 33 forward into the pipe to be cleared, the frame 29 is also driven rotationally about its supports 31 and 32. This rotation of the frame 29 drives the rod 33 rotationally on its own axis. Thus, the tool at the forward end of the coupled rod is rotated. Likewise, when the wheel 50 is driven rotationally in the opposite direction to return the rod to the cage of the reel, the frame 29 is also rotated, thereby to turn the tool out of the obstruction.

In the rodding machine described thus far, when rotation is in a direction to pull the rod from the storage cage or reel 30, the rod 33 is carried around the drive wheel 50 and is pushed into guide tube 39 which is fixed in location in the plane of the drive wheel 50. Thus, the delivery path of the rod 33 is in the plane of the drive wheel 50. This, however, is not a necessary requirement; the delivery path of the rod may be at an angle relative to the plane of the drive wheel. For example, in FIG. 20, I have shown a rodding machine in which the delivery path of the rod 33 is at right angles to the plane of the drive wheel 50.

Figure 20:
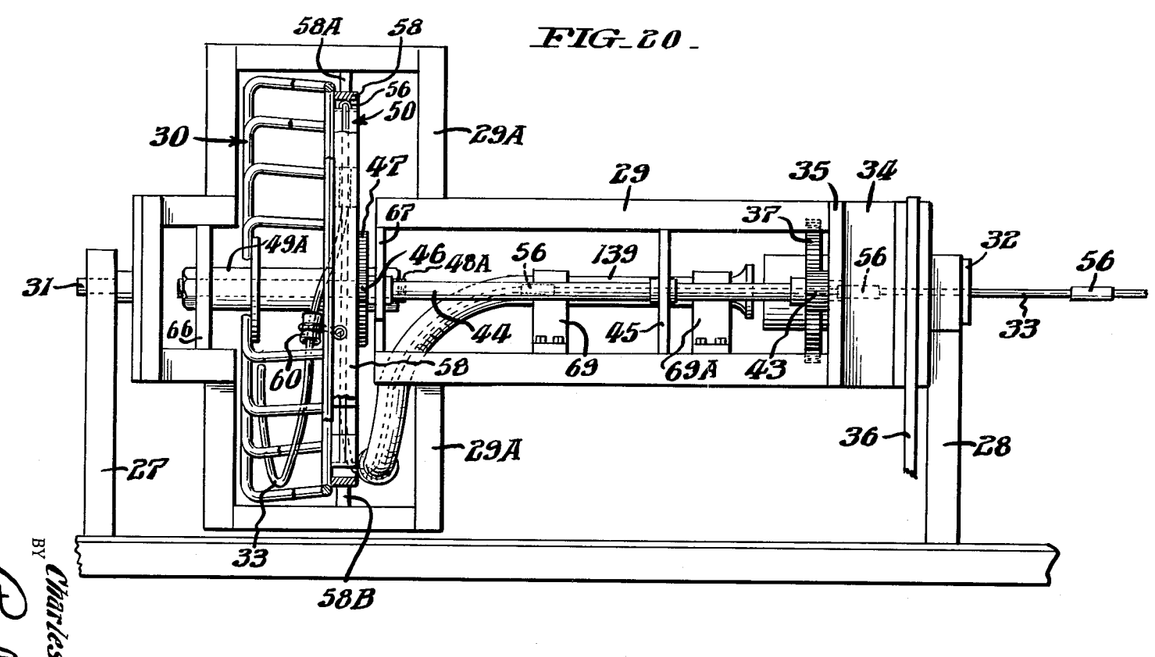
FIG. 20 is a side elevation of another form of rodding machine in which the planes both of the reel and of the drive wheel are perpendicular to the line along which the coupled rods travel as they are moved into or out of the rodding machine.

In FIG. 20, the rotatable frame 20, and the drive means for rotating the frame 29, are generally similar to that of FIGS. 1 and 2 except that in FIG. 20 the reel 30 and the slotted drive wheel 50 are mounted transversely with respect to the axis of rotation of the frame 29, rather than parallel therewith as in FIGS. 1 and 2, and the frame 29 is altered to receive the transversely-mounted reel and drive wheel.

As in FIG. 1, the frame 29 of FIG. 20 is adapted to be driven rotationally about the pivot points 31 and 32 by the drive belt 36 driving the drum 34. Drum 34 is fixed to the end member 35 of frame 29, and gear 37 is fixed to end member 35. Pinion 43, which meshes with gear 37, is supported in end member 35 and is fixed to shaft 44 journaled in bracket 45. Spur gear 46, fixed to the end of shaft 44, drives spur gear 47 which is fixed to the face of the slotted drive wheel 50.

Drive wheel 50 is rotatably mounted on shaft 48A journaled in support brackets 66 and 67. Reel 30 is mounted for free rotation on a sleeve 49A supported by shaft 48A.

Rotatable frame 29 is provided with a lateral offset portion 29A to which annular guard 58 is fixed, as by the brackets 58A, 58B.

Guide tube 139 has one end fixed to guard 58, from which point the tube 139 extends forward and inward in a double curve terminating in a straight portion located on the axis of rotation of frame 29, and supported from the frame 29, as by brackets 69 and 69A. The forward end of tube 139 may be flared, as shown.

When frame 29 is driven rotationally, as for example, in a clockwise direction (as viewed from the front of the machine, i.e., the right end in FIG. 20) the gears 43 and 46 are driven counterclockwise. The counter-clockwise rotation of gear 46 drives the wheel gear 47 in a clockwise direction, i.e., in the same direction of rotation as the frame 29. The gear ratios are, however, so selected that drive wheel 50 is rotated at a substantially higher rate of speed than is the frame 29, thus establishing the reaction force necessary to push the rod 33 through the guide tube 139 toward the forward end of the machine when the drive wheel 50 is rotating in the clockwise direction, and to pull the rod 33 in through the guide tube 139 when the drive wheel 50 is rotating counter-clockwise.

A guide eye 60 is provided for guiding the rod from the storage reel 30 on to (and from) the slotted surface of the drive wheel 50. The eye 60 is fixed to the guard 58, and thus rotates with the guard 58 and the frame 29.

A rodding machine having the structure of FIG. 20 is presented as one example of a rodding machine in which the slotted drive wheel 50 is located in a plane parallel with that of the plane of the reel 30, but in which both the reel and drive wheel are perpendicular to the direction in which the rod 33 is moved to and from the work.

Figure 21:
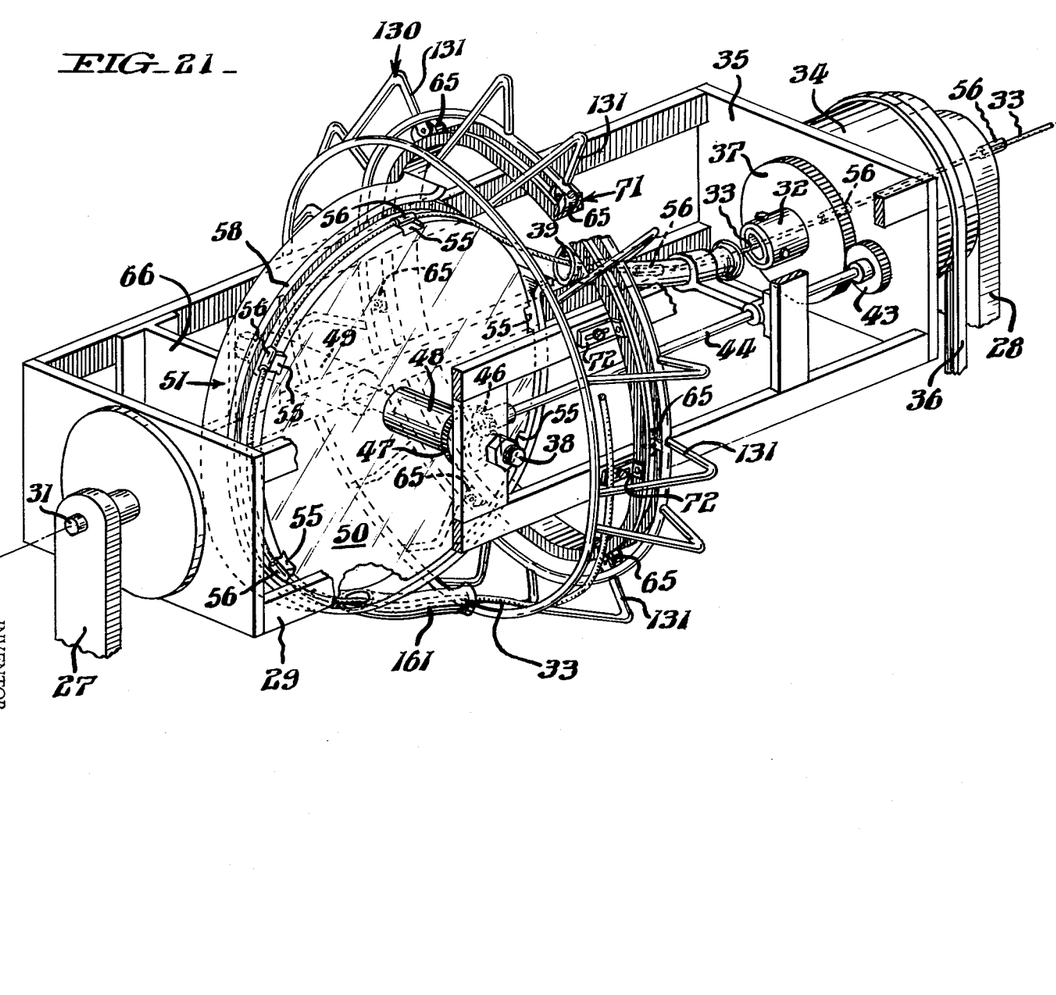
FIG. 21 is a perspective, partly broken away, of another form of rodding machine in which the planes of the cage and of the drive wheel are perpendicular to each other, with the plane of the cage being perpendicular to the line along which the coupled rods travel as they are moved into and out of the rodding machine.

FIG. 21 illustrates another modification similar in a number of respects to the structure shown in FIGS. 1–20 but differing in that the cage reel 130 and the slotted drive wheel 50 are located in planes which are perpendicular to each other, the cage reel 130 being in a plane perpendicular to the direction of movement of the coupled rod 33 as it moves into or out of the rodding machine, the drive wheel 50 being in the plane of the rod movement. In the modification illustrated in FIG. 21, an annular channel member or track 71 completely encircles the frame 29 in a plane transverse to the axis of the frame 29, and the cage reel 130, instead of being mounted for rotation on a center shaft, is mounted for rotation in the annular track 71.

As illustrated in FIG. 21 the track 71 is fixed to the frame 29, as by the adjustable brackets 72. Thus, the track 71 rotates with the frame 29 when the frame 29 is rotated. The cage reel 130, on the other hand, is mounted for free and independent rotational movement relative to the track 71 and hence also relative to the frame 29. This is accomplished by providing a caster or roller 65 at the inner extremity of some of the turned-in portions of the radial spokes 131 of the cage reel 130. These casters or rollers 65 are received by the channel of the track 71 and are free to roll about the track.

In FIG. 21, the frame 29 is driven rotationally, as by the V-belt 36 driving the drum 34. This causes the gear 37, which is fixed to the end wall 35 of frame 29, to drive the pinion 43. This drives shaft 44, the bevel gears 46 and 47, and the sleeve 48. Sleeve 48 is fixed to the drive wheel 50, which is thus caused to rotate. Assuming that the direction of rotation of frame 29 is such as to drive the drive wheel 50 in a clockwise direction, as viewed in FIG. 21, it will be seen that the coupled rods 33 are pulled by the wheel 50 from the cage reel 130 at the bottom, pulled through the lower guide tube 161, carried around by the wheel 50 and pushed out through the upper guide tube 39 in the direction of the work. The pull on the coiled rod 33 in the cage reel 130 tends to cause the coil to assume a smaller diameter, and the reaction forces are such that this causes the cage reel 130 to rotate about the frame 29 on the track 71 in a clockwise direction, as viewed in FIG. 21 from the rear end of the rodding machine.

When the frame 29 is driven in the opposite direction by the V-belt 36, the rotational direction of the drive wheel 50 is reversed, and the wheel 50 now rotates in a counter-clockwise direction, as viewed in FIG. 21. The coupled rod 33 is now pulled, by the drive wheel 50, in through the upper guide tube 39, is carried around the wheel 50, and is pushed out through the lower guide tube 161 into the cage reel 130. The coiled rod 33 in the cage 130 now tends to assume a larger diameter and the reaction forces are such that the cage reel 130 tends to rotate on track 71 about the frame 29 in a counter-clockwise direction, as viewed in FIG. 21 of the drawing from the rear end of the machine.

When the drive wheel 50 is being driven, clockwise to drive the rod 33 into the sewer pipe, if an obstruction encountered, the coupled rod 33 on the rim of the drive wheel 50 will tend to assume a larger diameter, but is prevented from so doing by the overhanging flange 58 of guard 51, as already described in connection with the embodiment of FIG. 7 and other embodiments. Guard 51, in FIG. 21, is supported by the bracket 66 fixed to the frame 29.

In FIG. 21, the slots 55 for the couplers 56 are illustrated as being of the same type as in FIGS. 7–10, i.e. open at one side. It will be understood that the slots may just as well, even preferably, be of the type shown in FIGS. 11 and 16, in which both sides of the slots are closed.

The principal function of the slotted wheel, such as wheel 50 of FIGS. 7 and 8, wheel 150 of FIG. 11, wheel 250 of FIG. 16, wheel 450 of FIG. 14, wheel 50 of FIG. 20, and wheel 50 of FIG. 21, is to drive the coupled rod 33 in the lengthwise direction, either toward or from the pipe to be cleared, by applying force against the couplers. However, the wheel may also be employed advantageously where the rod is a continuous rod, as distinguished from a coupled rod. For example, the type of rodding machine illustrated in FIGS. 1 and 2 may be used for continous rod, and the wheel 50 may be used to take the tortion or twist which is placed on the rod when the frame 29 is driven rotationally about the trunnions or pivot points 31 and 32. This tends to isolate the tortion or twist on the rod from the cage of the reel, and thereby tends to avoid distortion and entanglement of the coiled rod in the cage.

Also, where the guard used is a movable endless belt, rather than a fixed guard, and the wheel used has a peripheral groove in its rim, the combination of an endless belt and a grooved rim may be used to drive a continuous rod in its lengthwise direction by suitably tightening the belt to provide a frictional squeeze on the rod between the belt and the rim of the wheel.

It will be seen then that while the slotted drive wheel is primarily intended for use with coupled rods, rodding machines equipped with drive wheels of the type described herein may also be used for continuous rods.

While the preferred embodiments of this invention have been described in some detail, it will be obvious to one skilled in the art that various modifications may be made without departing from the invention as hereinafter claimed.

Having described my invention, I claim:

1. In a rodding machine; a base structure; a supporting frame mounted for rotation in said base structure, a cage reel for receiving and storing steel rod; means mounting said cage reel for free rotation in said supporting frame; a drive wheel mounted in said frame for rotation therewith, said wheel being mounted also for rotation on its own axis near to said cage reel and having a peripheral rim provided with recess means for receiving said rod; power means connected to said wheel for driving said wheel rotationally on its own axis in either direction for driving said rod in the directions of its longitudinal axis; and means for rotating said supporting frame for rotating said rod about its own longitudinal axis, said drive wheel taking twisting forces of said rotating rod.

2. Apparatus according to claim 1 characterized in that said wheel is mounted for rotation in a plane substantially parallel to the plane of said cage reel.

3. Apparatus according to claim 1 characterized in that said wheel is mounted for rotation in a plane substantially perpendicular to the plane of said cage reel.

4. Apparatus according to claim 2 characterized by the provision of a guard overlying a substantial portion of the rim of said wheel for containing said rod on said rim, and by the provision of guide means for guiding said rod from said reel to said rim.

5. Apparatus according to claim 3 characterized by the provision of a guard overlying a substantial portion of the rim of said wheel for containing said rod on said rim, and by the provision of guide means for guiding said rod from said reel to said rim.

6. Apparatus according to claim 4 characterized in that means are provided for mounting said guard on a fixed portion of said machine such that said guard does not rotate with said wheel.

7. Apparatus according to claim 5 characterized in that means are provided for mounting said guard on a fixed portion of said machine such that said guard does not rotate with said wheel.

8. In a rodding machine; a base structure, a supporting frame mounted for rotation in said base structure; a cage reel for receiving and storing steel rod coupled together by couplers; means mounting said reel in said supporting frame for free rotation about its center axis; a drive wheel mounted in said supporting frame for rotation therewith, said wheel being mounted also for rotation on its own axis near to said reel and having a peripheral rim provided with slots for receiving the couplers of said rod; power means connected to said wheel for driving said wheel rotationally on its own axis in either direction, thereby to drive said rod in the directions of its longitudinal axis; and means for rotating said supporting frame about an axis perpendicular to the axis of rotation of said wheel, for rotating said rod on its own longitudinal axis, said drive wheel taking the twisting forces of said rotating rod.

9. Apparatus according to claim 8 characterized in that said wheel is mounted for rotation in a plane substantially parallel to the plane of said cage reel.

10. Apparatus according to claim 8 characterized in that said wheel is mounted for rotation in a plane substantially perpendicular to the plane of said cage reel.

11. Apparatus according to claim 10 characterized by the provision of a guard overlying a substantial portion of the rim of said wheel for containing said coupled rod on said rim, and by the provision of guide means for guiding said rod from said reel to said rim.

12. In a rodding machine; a base structure; a supporting frame mounted for rotation in said base structure; a cage reel for receiving and storing steel rod coupled together by couplers; means mounting said reel in said supporting frame for free rotation about its center axis; a drive wheel mounted in said frame near to said reel for rotation with said frame and for rotation on its own axis in a plane substantially parallel to the plane of said cage reel, said wheel having a peripheral rim provided with slots for receiving the couplers of said rod; power means connected to said wheel for driving said wheel rotationally on its own axis in either direction, thereby to drive said rod in the directions of its longitudinal axis; means for rotating said supporting frame about an axis perpendicular to the axis of rotation of said wheel for rotating said rod on its own longitudinal axis, said drive wheel taking the twisting forces of said rotating rod; a guard overlying a substantial portion of the rim of said wheel for containing said coupled rod on said rim; and guide means for guiding said rod from said reel to said rim.

13. Apparatus according to claim 12 characterized in that means are provided for mounting said guard on a said supporting frame of said machine such that said guard does not rotate about the axis of said wheel.

14. Apparatus according to claim 11 characterized in that means are provided for mounting said guard on a said supporting frame of said machine such that said guard does not rotate about the axis of said wheel.

15. Apparatus according to claim 13 characterized in that said guide means is secured to said guard and positioned to guide said coupled rod from said reel to the center line of said rim.

16. Apparatus according to claim 15 characterized in that said slots are closed recesses in the surface of said rim.

17. Apparatus according to claim 13 characterized in that said guide means is secured to said guard and positioned to guide said coupled rod angularly from said reel onto the rim of said wheel.

18. Apparatus according to claim 17 characterized in that said slots in the rim of said wheel are recesses open at the side facing said reel.

19. Apparatus according to claim 15 characterized in that said guide means is a twisted tube, one end of which is secured to the overlying portion of said guard and that said guard is provided with an opening at the place where said one end of said tube is connected.

References Cited by the Examiner

UNITED STATES PATENTS

| | | |
|---|---|---|
| 1,085,077 | 1/1914 | Ballard. |
| 2,210,300 | 8/1940 | Macgruder _________ 242—54 X |
| 2,247,004 | 6/1941 | Sullivan __________ 242—54 X |
| 2,488,039 | 11/1949 | Sketchley _________ 15—104.3 |
| 2,842,768 | 7/1958 | Halperin. |
| 2,859,937 | 11/1958 | Robins et al. ____ 254—175.5 X |
| 2,870,973 | 1/1959 | Carlson ____________ 242—54 |
| 3,016,206 | 1/1962 | Cone ______________ 242—54 |
| 3,039,715 | 6/1962 | Caperton ___________ 242—82 |
| 3,086,234 | 4/1963 | Crane ____________ 15—104.3 |
| 3,106,734 | 10/1963 | Siegal ___________ 15—104.3 |
| 3,120,017 | 2/1964 | Ciaccio __________ 242—54 X |

MERVIN STEIN, *Primary Examiner.*

W. S. BURDEN, *Assistant Examiner.*